United States Patent
Song et al.

(10) Patent No.: US 6,862,088 B2
(45) Date of Patent: Mar. 1, 2005

(54) METHOD AND APPARATUS FOR PROVIDING ADAPTIVE CONTROL OF TRACK SERVO

(75) Inventors: Hubert Song, Sunnyvale, CA (US); Hwee Chin Ong, Sunnyvale, CA (US)

(73) Assignee: Zoran Corporation, Sunnyvale, CA (US)

( * ) Notice: Subject to any disclaimer, the term of this patent is extended or adjusted under 35 U.S.C. 154(b) by 223 days.

(21) Appl. No.: 10/013,068

(22) Filed: Dec. 7, 2001

(65) Prior Publication Data

US 2003/0107727 A1 Jun. 12, 2003

(51) Int. Cl.$^7$ .................. G01N 21/00; G01N 21/88; G11B 7/00
(52) U.S. Cl. .............. 356/237.2; 369/44.32; 369/53.15; 250/559.45
(58) Field of Search .............. 369/43, 44.11, 369/44.14, 44.17, 44.25, 44.26, 44.32, 53.12, 53.15; 348/126; 356/237.2, 237.3, 237.4, 237.5; 250/559.4, 559.41, 559.45, 559.46

(56) References Cited

U.S. PATENT DOCUMENTS

| 4,505,585 | A | * | 3/1985 | Yoshikawa et al. ...... 356/237.2 |
| 4,799,206 | A | | 1/1989 | Imanaka |
| 4,954,723 | A | | 9/1990 | Takahashi et al. |
| 5,256,965 | A | * | 10/1993 | Nomura ...................... 324/212 |
| 5,321,675 | A | * | 6/1994 | Ito et al. ..................... 369/30.2 |
| 5,623,465 | A | * | 4/1997 | Sasaki et al. ............. 369/44.32 |
| 5,682,307 | A | * | 10/1997 | Sasaki et al. ............. 369/44.28 |
| 5,818,804 | A | | 10/1998 | Obata et al. |
| 6,188,657 | B1 | * | 2/2001 | Kim et al. ................ 369/53.11 |
| 6,282,157 | B1 | * | 8/2001 | Kim et al. ................ 369/44.35 |
| 6,480,445 | B1 | * | 11/2002 | Yun et al. ................. 369/44.32 |
| 6,654,329 | B1 | * | 11/2003 | Kondo et al. ............. 369/53.27 |
| 2001/0026508 | A1 | * | 10/2001 | Sasaki et al. ............. 369/44.32 |
| 2001/0055247 | A1 | * | 12/2001 | Tateishi et al. ........... 369/44.32 |

* cited by examiner

*Primary Examiner*—Zandra V. Smith
*Assistant Examiner*—Gordon J. Stock, Jr.
(74) *Attorney, Agent, or Firm*—Blakely Sokoloff Taylor & Zafman LLP; Judith A. Szepesi

(57) ABSTRACT

The present invention is a method and system to provide adaptive control in an optical storage medium. The method comprises providing a beam of light, reflecting the beam of light off an optical disk and detecting the reflected beam. A value of the reflected beam is compared with a predetermined value, and an output signal is generated if the value of the reflected beam is greater than the predetermined value. A timing signal having a timing interval is generated and a control signal is generated if the output signal occurs over the timing interval. One of a current servo signal and a predetermined servo signal is provided in response to the control signal and a position of the light beam is controlled based on one of the current servo signal and the predetermined servo signal.

14 Claims, 3 Drawing Sheets

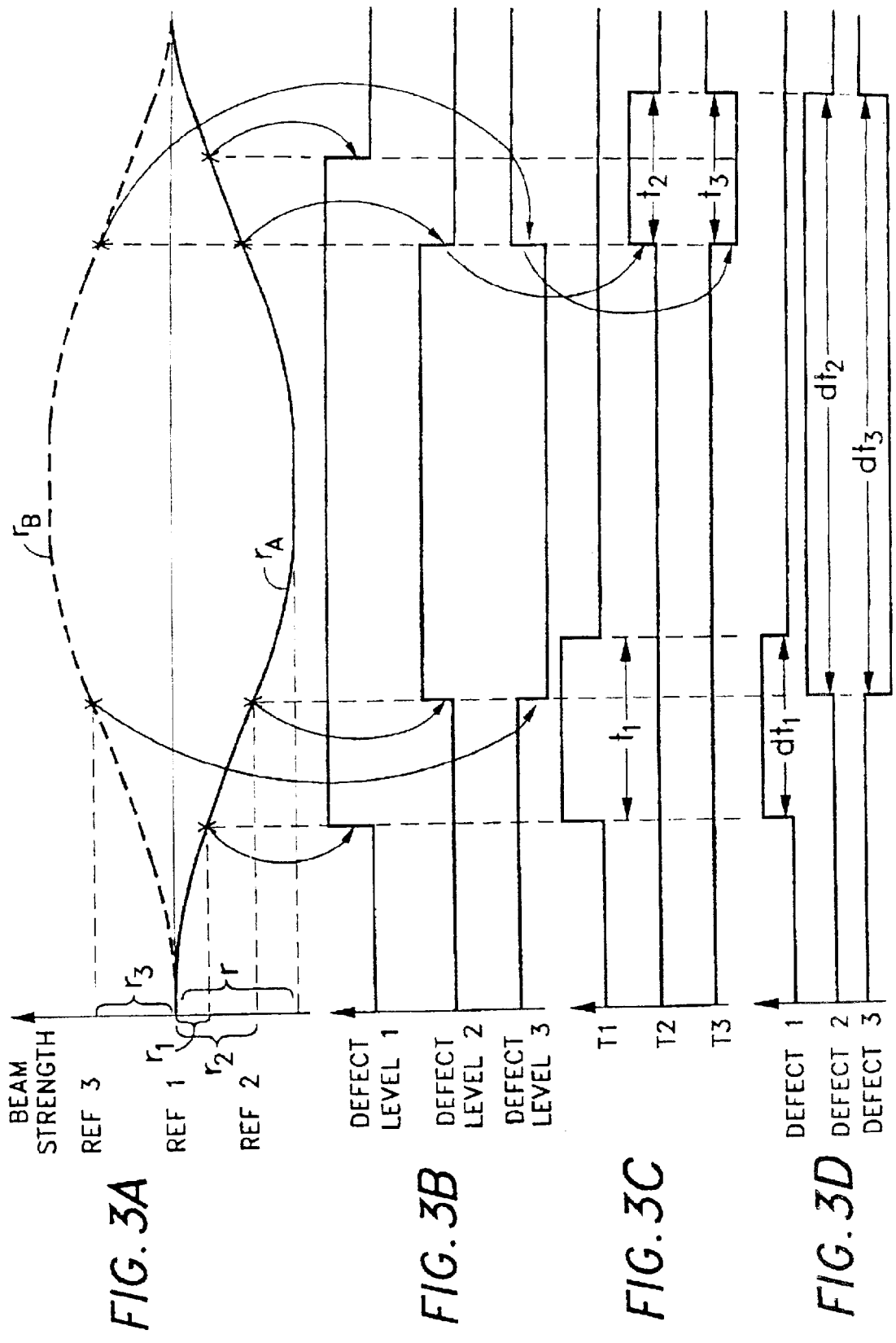

METHOD AND APPARATUS FOR PROVIDING ADAPTIVE CONTROL OF TRACK SERVO

BACKGROUND OF THE INVENTION

1. Field of the Invention

The present invention relates in general to optical disk storage systems and more particularly, to a method and apparatus for providing adaptive control of track servo.

2. Description of the Related Art

In recent years, optical disk devices have been used to record or reproduce large amounts of data. Optical disks are storage mediums from which data is read and to which data is written by laser. Each optical disk can store a large amount of data, typically in the order of 6 gigabytes. Such optical disk devices are under active technical developments for achieving higher recording density.

Current rewritable optical disks include spiral-shaped groove tracks having concave and convex portions formed on the surface of a disk substrate. On the surface of the substrate, a thin film that includes a recording material as a component is attached. During fabrication of the disks, concave and convex portions (pits) are often formed on the recording surface, simultaneously with the formation of guide grooves for tracking control, so as to record address information of each sector.

Each track of the optical disk is irradiated with a light beam having a predetermined recording power, so as to form recording marks on the recording thin film. The portions irradiated with the light beam (i.e., the recording marks) have different optical characteristics (reflection characteristics) from the other portions of the recording thin film. Thus, the recorded information can be reproduced or read by irradiating the track with a predetermined reproduction power and detecting light reflected from the recording film.

Accurate reading of information recorded on such optical disks may be impaired due to the existence of defects such as fingerprints, black dots, scratches and interruptions. When such defects are encountered during the read process, the optical head may be directed to move to a different track. In particular, defects are detected by monitoring a change in the beam strength signal reflected off the disk. Although the read information corrupted by defects resulting from scratches and black dots are irrecoverable, defects resulting from fingerprints render noisy but meaningful data. If the defect is not properly processed and handled, the resulting tracking error signal will be erroneous. Upon reading the erroneous tracking error signal, the servo control will direct the optical head to move off the current track. As a result, system performance is unnecessarily compromised.

Accordingly, there is a need in the technology to overcome the aforementioned problems.

BRIEF SUMMARY OF THE INVENTION

The present invention is a method and system to provide adaptive control in an optical storage medium. The method comprises providing a beam of light, reflecting the beam of light off an optical disk and detecting the reflected beam. A value of the reflected beam is compared with a predetermined value, and an output signal is generated if the value of the reflected beam is greater than the predetermined value. A timing signal having a timing interval is generated and a control signal is generated if the output signal occurs over the timing interval. One of a current servo signal and a predetermined servo signal is provided in response to the control signal and a position of the light beam is controlled based on one of the current servo signal and the predetermined servo signal.

BRIEF DESCRIPTION OF THE DRAWINGS

FIGS. 3A–D illustrate one embodiment of the timing diagram implemented in the process of the invention.

DETAILED DESCRIPTION OF THE INVENTION

The present invention is an apparatus and methods for providing adaptive control of track servo in an optical disk system.

Figure 1:
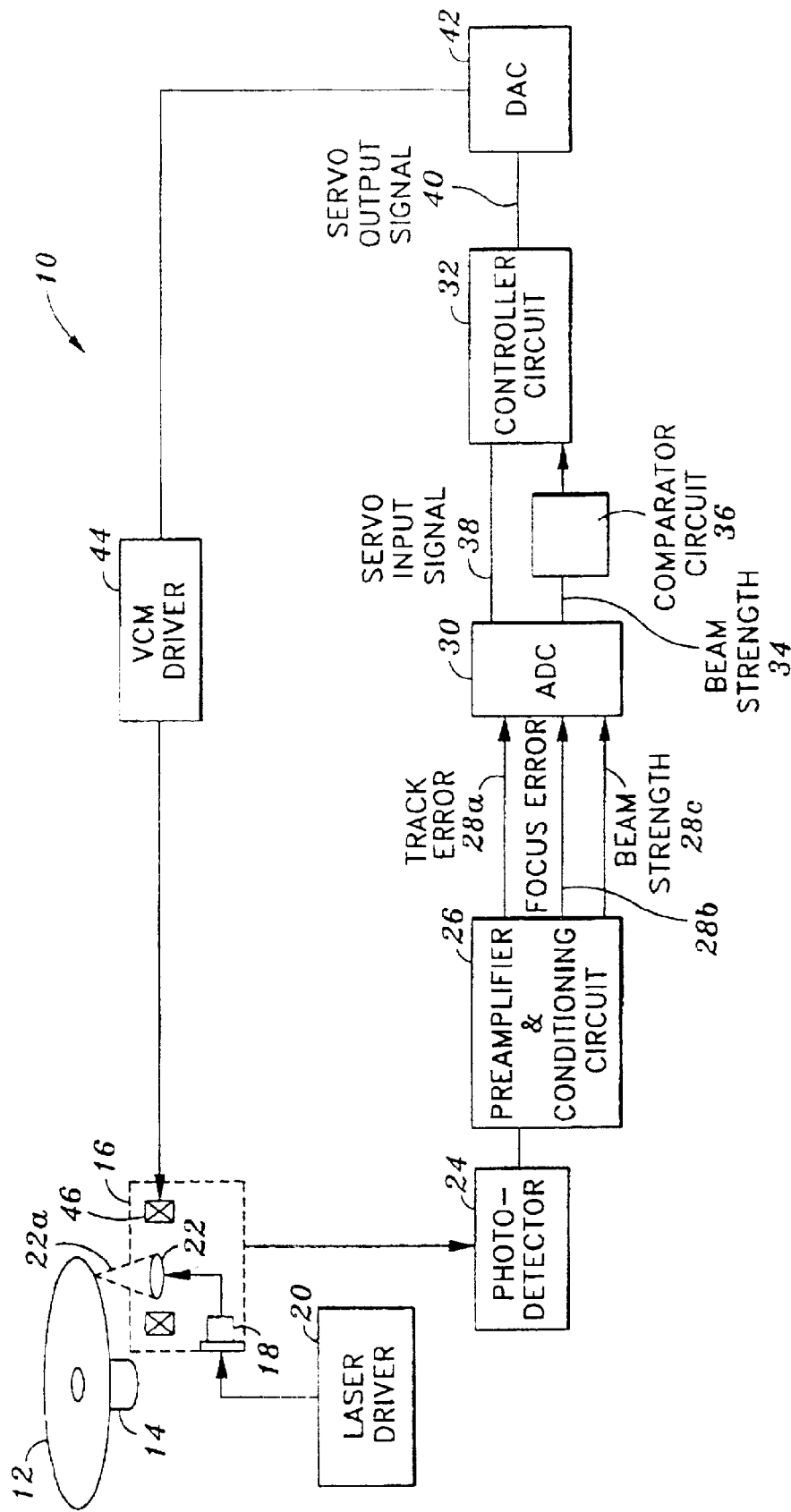
FIG. 1 illustrates one embodiment of an optical disk apparatus provided in accordance with the principles of the invention.

Referring to the drawings-more particularly by reference numbers, FIG. 1 illustrates one embodiment of an optical disk apparatus 10. The optical disk apparatus 10 includes an optical disk 12 that is rotated by a spin motor 14. An optical pickup 16 scans the tracks on the rotating disk 12 with a laser beam. The optical pickup 16 comprises an optical system including a laser 18 that provides a light source, and an objective lens 22. The laser 18 is driven by a laser driver 20 to emit a laser beam. The laser beam is incident on the objective lens 22 via optical elements (not shown) such as a collimator lens and a beam splitter. The laser beam 22a is focused on the recording surface of the optical disk 12 by the objective lens 22 to form a small spot on the recording surface.

The light reflected from the optical disk 12 propagates back to the objective lens 22 and is separated from the incident laser beam by the beam splitter. The reflected light beam is detected by the photodetector 24. This photodetector 24 converts this reflected light beam into electric signals.

The electric signal is then provided to a preamplifier and conditioning circuit 26, which amplifies and conditions the electric signal. Based on the received electric signal, the preamplifier and conditioning circuit 26 generates a plurality of signals, including a track error signal 28a, a focus error signal 28b and a beam strength signal 28c. The beam strength signal 28c is a signal generated from either the main or the side beams of the reflected light beam, or a combination of both the main and side beams, and it represents the disc reflection of the beam spot as the optical head moves across the disc surface. The tracking error signal represents the tracking servo quality based on the reflected light beam. It is understood that additional signals may be provided by the circuit 26.

One aspect of the invention involves using the beam strength signal 28c to detect defects and to distinguish the defects detected. Defects may result from (but are not limited to) black dots, interruptions, scratches and fingerprints. A black dot is a media defect characterized by loss of reflectivity of the incident laser beam. Such a defect is typically identified when reflectivity is less than 80% of typical reflected beam strength. An interruption is a media defect that results in reflectivity that is higher than typical reflected beam strength. Such a defect is typically identified when reflectivity is greater than 80% than typical reflected beam strength. Scratches on the disc surface result in signal characteristics that are similar to that obtained due to a black dot, and is treated in the same way. Defects from fingerprints generally weaken the reflected beam, and makes it noisier. However, the resulting reflected beam and tracking signal are still usable. Defects from fingerprints typically result in reflectivity that is 33% less than typical reflected beam strength.

In one embodiment of the invention, defects resulting in loss of reflectivity at or below a first predetermined level are distinguished from defects resulting in loss of reflectivity at or above a second predetermined level. It is to be understood that defects resulting in loss of reflectivity at or below a first predetermined level may also be similarly distinguished from defects resulting in loss of reflectivity at or above a third predetermined level.

In another embodiment, to ascertain the existence of the defects, a timer is triggered upon the initial detection of the defect. If the beam strength is generally consistent over the duration of a predetermined interval, the defect is considered to be a true defect, as opposed to random noise or spikes. Upon such confirmation, the system of the invention proceeds to take action.

The signals 28a, 28b and 28c are converted to digital signals by an analog-to-digital converter (ADC) 30. The ADC 30 provides the tracking error signal 28a and the focus error signal 28b to a controller circuit 32, while the digitized beam strength signal 34 is provided to a comparator circuit 36. The comparator circuit 36 generates digital defect level signals, based on the beam strength 34 signal. The controller circuit 32 generates a servo output signal 40, which is converted back to an analog signal via digital-to-analog circuit 42. The analog servo output signal 40 is provided to a voice coil motor (VCM) driver 44, which supplies a drive current to the tracking actuator 46 in accordance with the servo output signal to drive the tracking actuator. The tracking actuator 46 moves the objective lens in the radial direction of the optical disk 12, so that the beam spot is positioned in the radial direction of the disk so as to track the pit stream. In other words, tracking control is performed.

Figure 2:
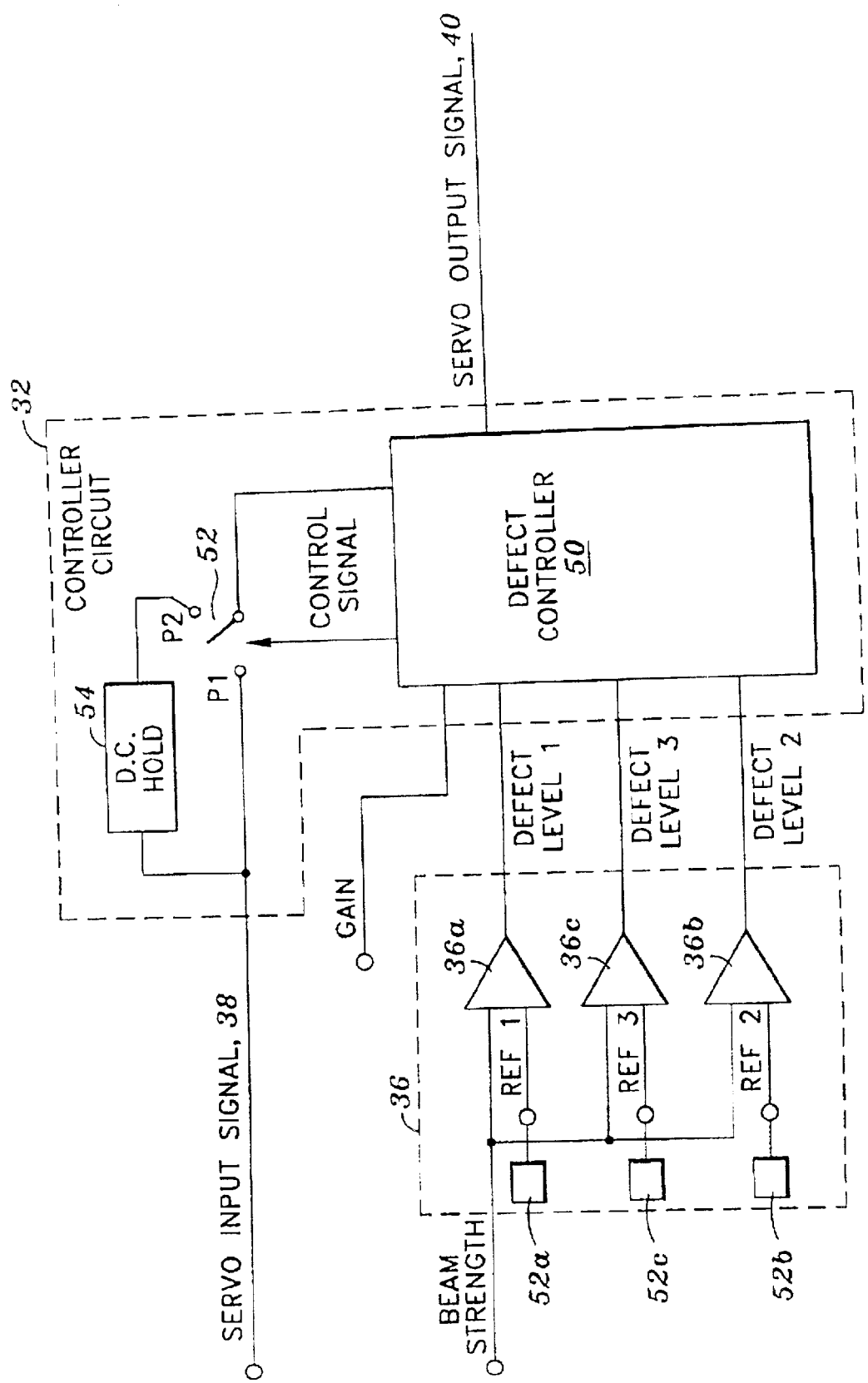
FIG. 2 illustrates one embodiment of the comparator circuit 36 and the controller circuit 32 of FIG. 1.

FIG. 2 illustrates one embodiment of the comparator circuit 36 and controller circuit 32 of FIG. 1. As shown, the comparator circuit comprises three comparators 36a, 36b and 36c. It is understood that the comparator circuit 36 may include fewer or a greater number of comparators, as determined by need or design. In one embodiment, the comparator circuit 36 comprises at least one comparator. Each comparator 36a, 36b and 36c has two input terminals, one of which is coupled to receive the digitized beam strength signal 34 from ADC 30. The other input terminal of each comparator 36a, 36b and 36c is coupled to receive a reference signal, such as Ref 1, Ref 2 and Ref 3. The output of each comparator 36a, 36b and 36c is coupled to a defect controller 50 in the controller circuit 32. For example, Ref 1 may be a reference signal level for data having defects due to a fingerprint; Ref 2 may be a reference level for data having defects due to black dots or scratches; and Ref 3 may be a reference level for data having defects due to interruptions. If the digitized beam strength 34 signal is greater than Ref 1, Ref 2 or Ref 3, the respective comparator 36a, 36b or 36c will generate an output signal.

The controller circuit 32 receives the output signal(s) from the comparators 36a, 36b, 36c and determines if it should direct the VCM driver 44 to continue reading or to hold the optical pickup 16 at a previous track error level. For example, if only data with fingerprint defects are detected, the controller circuit 32 will direct the VCM driver 44 to continue reading data. If data with black dot or interruption or scratches defects are detected, the controller circuit 32 will direct the VCM driver 44 to hold the optical pickup 16 at the track error level prior to encountering the defect.

In one embodiment, the controller circuit 32 comprises a defect controller 50, a switch 52 and a direct current (D.C.) Hold circuit 54. The controller circuit 32 may provide either the servo input signal 38 or a predetermined signal from D.C. Hold circuit 54 as the servo output signal 40. In one embodiment, the D.C. Hold circuit 54 provides a D.C. level that is substantially the same signal level as a servo input signal immediately prior to encountering a defect. If the beam strength signal 28c is within a range that is considered typical or normal, the servo input signal 38 is provided as the servo output signal 40. In one embodiment, the defect controller 50 issues a control signal to direct the switch 52 to move to position P1, where the servo input signal 38 is provided as the servo output signal 40. However, if the beam strength 28c falls below a minimum level or above a maximum level, the defect controller 50 issues a control signal to direct the switch to move to P2, where a predetermined D.C. level is provided as the servo output signal 40. Details of this process are discussed in the following sections.

In operation, each comparator 36a, 36b and 36c receives the digitized beam strength signal 34 and compares it to a respective reference signal level, Ref 1, Ref 2 and Ref 3, as provided by reference signal circuits 52a, 52b and 52c. In one embodiment, if the beam strength signal 34 is higher than the absolute value of the reference signal level Ref 1, Ref 2 or Ref 3, the respective comparator 36a, 36b and 36c will generate an output signal.

FIGS. 3A–D illustrate one embodiment of the timing diagram implemented in the process of the invention. FIG. 3A illustrates one embodiment of the beam strength of the reflected beam off the disk 12 (FIG. 1) from laser beam 22. The beam strength of a typical signal is represented by r. FIG. 3A illustrates one embodiment of a reflected beam rA that results from a loss of reflectivity, and a reflected beam rB that results from over reflectivity. In one embodiment, a first predetermined level, Ref 1, r1, is established to monitor defects resulting from a loss of reflectivity of at least 33% of the typical reflected beam strength, r. In a second embodiment, a second predetermined level, Ref 2, r2, is established to monitor defects resulting from a loss of reflectivity of at least 80% of the typical reflected beam strength, r. In a third embodiment, a third predetermined level, Ref 3, r3, is established to monitor defects resulting from an increased reflectivity of at least 80% of the typical reflected beam strength, r. It is to be understood that the first, second, and third predetermined levels may be established at any level that the user determines or as required. In addition, a greater number of predetermined levels may also be established. With reference to FIG. 2, each comparator 36a, 36b, and 36c receives the digitized beam strength signal 34 and compares it to a respective reference signal, Ref 1, Ref 2, and Ref 3, as provided by reference signal circuits 52a, 52b and 52c. In one embodiment, if the beam strength signal 34 falls below a first predetermined level, such as is higher than r1 where r1 is the magnitude of the signal loss, the comparator 36a will generate an output signal, Defect Level 1 (see FIG. 3B). If the beam strength signal 34 falls below a second predetermined level, such as is higher than r2 where r2 is the magnitude of signal loss, the comparator 36b will generate an output signal, Defect Level 2 (see FIG. 3B). In a further embodiment, if the beam strength signal is greater than a third predetermined level, r3, the comparator 36c will generate an output signal, Defect Level 3 (see FIG. 3B). In one embodiment, the output signal Defect Level 3 is provided as an inversion of the output signal Defect Level 2, so as to distinguish between the two signals.

Each of the output signals, Defect Level 1, 2 and 3 are provided to the Defect Controller 50 within the controller circuit 32. In response to each output signal, generates one-shot timer having pre-defined timing interval. In one embodiment, the one-shot timer T1 is triggered by the positive or rising edge of the Defect Level 1 signal, while the one-shot timer T2 (having a duration of t2) is generated by the negative or trailing edge of the output signal Defect Level 2. The one-shot timer T3 (having a duration of t3) is triggered by the positive or rising edge of the Defect Level 3 signal. In one embodiment, t1, t2 and t3 are of the same duration. In a second embodiment, t1, t2 and t3 are 45 microseconds.

As shown in FIG. 3D, an output signal, Defect 1 is generated by Defect Controller 50, if the Defect Level 1 signal is present. At the rising or leading edge of Defect Level 1, the defect controller 50 issues a first control signal to direct the switch 52 to position P2. The signal Defect 1 indicates that a defect resulting from a loss of reflectivity at a first predetermined level (such as that from a fingerprint) has been detected. If no other defects are detected during t1, the defect controller 50 issues a second control signal to direct the switch 52 to move back to position P1, so that the controller circuit 32 will continue to receive the servo input signal in an unaltered fashion. This is because defects arising from fingerprints, while noisy, are still of a sufficiently good quality to be of use.

However, if, during the interval t1, the signal beam strength falls to that of a second predetermined level (see FIG. 3B, Defect Level 2; and FIG. 3C, T2), the defect controller 50 will generate an output signal Defect 2. In one embodiment, the generation of Defect 2 indicates that a non-fingerprint defect has been encountered, and that signal recovery is required. In this situation, the defect controller 50 will continue to direct the switch 52 to remain in position P2, so that the servo input signal is held at a predetermined level as set by D.C. Hold circuit 54 for the duration of dt2. In one embodiment, the duration dt2 has a time interval that begins from the time that Defect Level 2 is generated and ends when the one-shot timer T2 times out. This time duration is typically needed to allow for the track error signal to recover from the defect. Once timing dt2 times out, the defect controller 50 will issue a control signal to direct the switch 52 to return back to position P1.

Similarly, an output signal Defect Level 3, representative of a third type of defect, may be generated by comparator 36c when a defect having a reflectivity that is greater than Ref 3 is encountered. If the third defect is encountered during t1, the defect controller 50 may generate a control signal to direct the switch 52 to remain in position P2, so that the servo input signal is held at a predetermined level as set by D.C. Hold circuit 54 for the duration of dt3. In one embodiment, the duration dt3 has a time interval that begins from the time that Defect Level 3 is generated and ends when the one-shot timer T3 times out. This time duration is typically needed to allow for the track error signal to recover from the defect. Once timing dt3 times out, the defect controller 50 will issue a control signal to direct the switch 52 to return back to position P1. By implementing the invention, signals that have been marginally corrupted due to recoverable defects such as fingerprints, but are would otherwise provide meaningful data, are processed in a normal manner. Signals that have been corrupted and are irrecoverable due to defects such as black dots, scratches, and interruptions are not processed. Instead, the servo output signal based on such corrupted read signals are switched to a predetermined level (typically a previously uncorrupted signal level), until normal read signal levels are received.

Through the implementation of the invention, servo tracking in an optical disk apparatus may be provided with greater accuracy. As a result, system performance is enhanced.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. A system for providing adaptive control in an optical storage medium, comprising:

a light source that generates a beam of light;

an optical disk that reflects the beam of light;

a detector for receiving the reflected beam;

a first comparator coupled to the detector to compare a value of the reflected beam with a first predetermined value, said first comparator to generate a first output signal if the value of the reflected beam is greater than said first predetermined value;

a controller circuit coupled to the first comparator, said controller circuit having a timer, said timer to generate a timing signal having a timing interval, said controller circuit to generate a control signal if said first output signal occurs over said timing interval, said controller circuit to provide one of a current servo signal and a predetermined servo signal in response to said control signal; and a driver circuit coupled to said controller circuit and said light source, said driver circuit to control a position of said light source based on one of said current servo signal and said predetermined servo signal;

a second comparator coupled to the detector to compare the value of the reflected beam with a second predetermined value, said second comparator to generate a second output signal if the value of the reflected beam is greater than said second predetermined value, said second output signal to be generated during said timing interval and wherein said second predetermined value is higher than said first predetermined value.

2. The system as recited in claim 1, wherein said driver circuit maintains a current position of said light source based on said current servo signal.

3. The system as recited in claim 2, wherein said first output signal corresponds to a defect on said optical disk.

4. The system as recited in claim 3, wherein said defect is a recoverable defect.

5. The system as recited in claim 1, wherein said driver circuit directs said light source to a predetermined position based on said predetermined servo signal.

6. The system as recited in claim 5, wherein said second output signal corresponds to a defect on said optical disk.

7. The system as recited in claim 6, wherein said defect is an irrecoverable defect.

8. A method for providing adaptive control in an optical storage medium, comprising:

providing a beam of light;

reflecting said beam of light off an optical disk;

detecting said reflected beam;

comparing a value of the reflected beam with a first predetermined value, generating a first output signal if the value of the reflected beam is greater than said first predetermined value;

comparing the value of the reflected beam with a second predetermined value, generating a second output signal if the value of the reflected beam is greater than said second predetermined value, wherein said second predetermined value is higher than said first predetermined value;

generating a timing signal having a timing interval;

generating a control signal if said first output signal occurs over said timing interval, and wherein said second output signal is generated during said timing interval;

providing one of a current servo signal and a predetermined servo signal in response to said control signal; and controlling a position of said light beam based on one of said current servo signal and said predetermined servo signal.

9. The method as recited in claim 8, wherein said position of said light beam is maintained at a current position based on said current servo signal.

10. The method as recited in claim 9, wherein said first output signal corresponds to a defect on said optical disk.

11. A method as recited in claim 10, wherein said defect is a recoverable defect.

12. The method as recited in claim 8, further comprising directing said light source to a predetermined position based on said predetermined servo signal.

13. The method as recited in claim 12, wherein said second output signal corresponds to a defect on said optical disk.

14. The method as recited in claim 13, wherein said defect is an irrecoverable defect.

* * * * *